United States Patent [19]
Asai

[11] Patent Number: 5,545,365
[45] Date of Patent: Aug. 13, 1996

[54] METHOD FOR MOLDING A DISC WITH A CENTRAL APERTURE

[75] Inventor: Ikuo Asai, Nagoya, Japan

[73] Assignee: Meiki Co., Ltd., Ohbu, Japan

[21] Appl. No.: 332,034

[22] Filed: Nov. 1, 1994

[30]   Foreign Application Priority Data

Nov. 15, 1993  [JP]  Japan .................................. 5-309825

[51] Int. Cl.⁶ .................................................... B29C 45/00
[52] U.S. Cl. ...................... 264/328.7; 264/106; 264/334; 425/556; 425/810
[58] Field of Search ..................... 264/155, 161, 264/328.7, 106, 107, 334, 336; 425/556, 810, DIG. 51

[56]         References Cited

U.S. PATENT DOCUMENTS 4,772,196  9/1988  Asai ......................... 425/155

5,092,758  3/1992  Tanaka et al. .................. 425/422
5,297,951  3/1994  Asai ........................ 425/556

FOREIGN PATENT DOCUMENTS 63-237921  10/1988  Japan .

*Primary Examiner*—David W. Wu
*Attorney, Agent, or Firm*—Browdy and Neimark

[57]          ABSTRACT

A central aperture of a molded disc being severed by protruding of the gate cutter and also a molded disc being released from a cavity by blowing of air from the passage provided between an inner periphery of the central stamper holder and an outer periphery of the bushing into the cavity, the molten resin with which the protruded gate cutter is surrounded, is pressed by the first protrusion of an ejector sleeve for preventing occurrence of a round corner D formed along the edge of the central aperture and for preventing generating of the clouds on the surface of the information area of the disc.

4 Claims, 5 Drawing Sheets

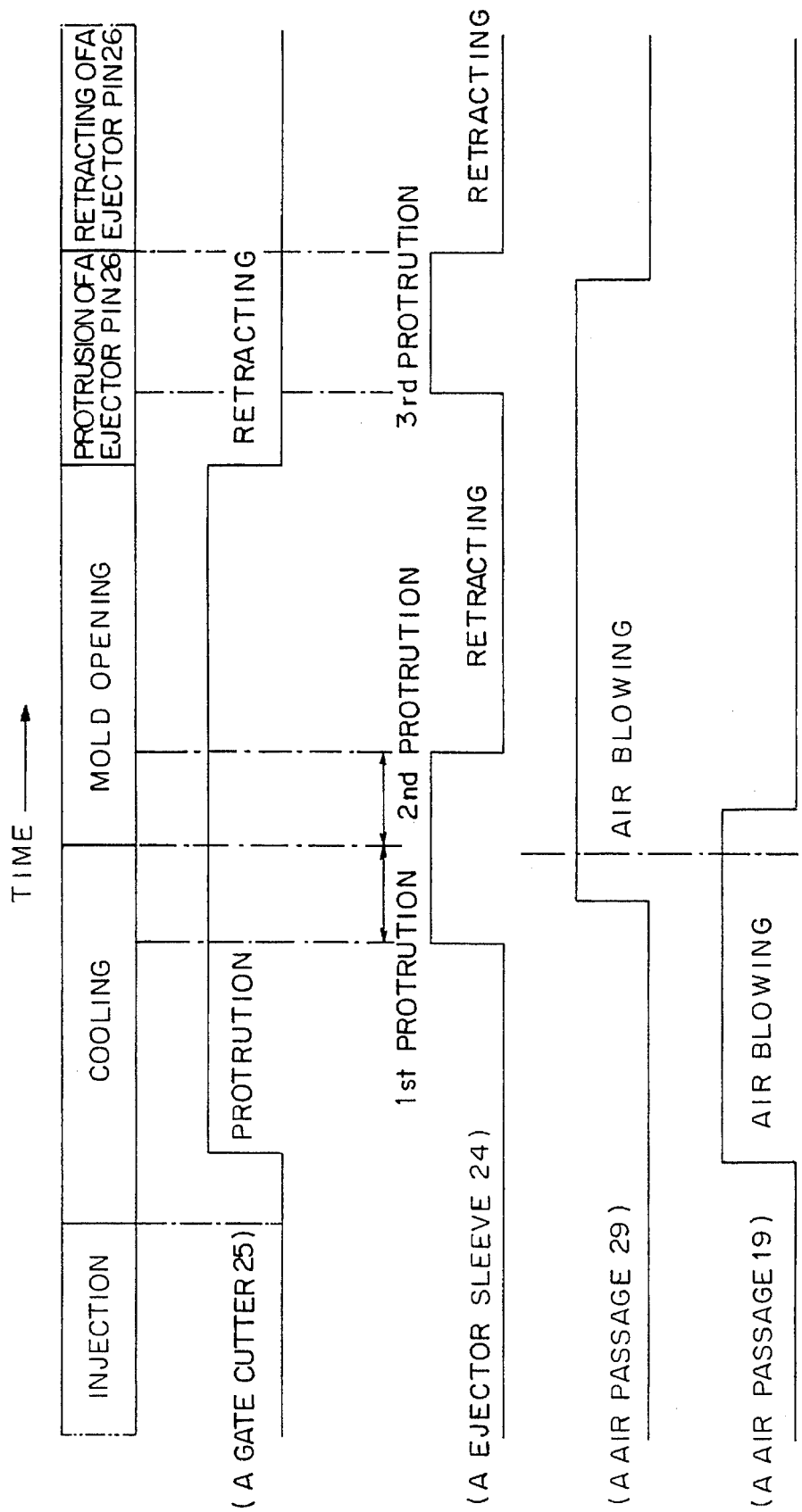

METHOD FOR MOLDING A DISC WITH A CENTRAL APERTURE

BACKGROUND OF THE INVENTION

The present invention relates generally to a method for molding a disc with a central aperture, and more particularly concerns a method for preventing faults which take place in forming the central aperture of the disc after molten resin has been injected into an injection molding cavity.

DESCRIPTION OF RELATED ART

A mold as shown in FIG. 5 comes into use generally for the injection molding of compact discs and laser discs, etc.

There are provided female cutter 11, a sprue bushing 12, and air passage 19 for blowing air in a stationary mold half 10; and a stamper 21, an inner stamper holder 22, a stationary sleeve 23, an ejector sleeve 24, a gate cutter (or male cutter) 25, a center ejector pin 26, and an air passage 29 in a movable mold half 20 as shown in FIG. 5. Also FIG. 5 illustrates such a device in a state of its operation wherein a gate portion G is severed by protruding of the gate cutter 25 after molten resin has been injected into the cavity C from the nozzle N and during cooling before opening of the mold halves.

On opening of the mold halves, air is blown through the air passage 19 in the stationary mold half 10 and also through the air passage 29 in the movable mold half 20, to a molded disc P of which the gate portion G has been severed, to make the molded disc release slightly from the cavity C, and successively to take the molded disc P and the sprue out the cavity by action of the ejector sleeve 24 and the center ejector pin 26.

However, molten resin along the inner periphery H of the central aperture of the freshly molded disc P is apt to be dragged due to protruding of the gate cutter 25 in severing of the gate portion G, in the above described prior art system of FIG. 5. Consequently a round corner D is likely to be undesirably formed often along the edge of the central aperture as shown in more detail in FIG. 6. Such a round corner D not only results in disc rejection due to poor appearance during inspection of the articles, but if the disc passes visual inspection the round corner D can often cause eccentricity of the disc during use, thus causing customer dissatisfaction.

Also, the shorter the cooling time of the molded disc, the more frequent the above problem occurs. Therefore, the tendency of the occurrence of the round corner D causes the manufacturer to increase the cooling time thus increasing the cost, contrary to what is desired.

Also, so-called "cloud" marks appear often on the surface of information area of a disc when releasing the disc from the prior art cavity. When the mold halves are opened after cooling of the molded disc has been finished in the cavity in which molten resin had been injected, air is blown to both surfaces of the molded disc through the air passages 19, 29 of the stationary and movable mold halves 10, 20 for releasing the molded disc from the cavity. However, in the case where the blown air does not flow smoothly and spread radially, the above mentioned cloud marks appear on the surface of the information area of a disc. Explaining in more detail regarding FIG. 5, it is desirable that the blown air A flow evenly and that it spread in the radial direction on the information area of the molded disc from the blown air outlet in releasing of the molded disc; however, actually the blown air flows not only on the surface of the information area of the disc but also leaks into the inner periphery H of the central aperture with the result that the blown air will not flow evenly on the surface of the information area of the disc. Such uneven flow of the blown air results in uneven releasing of the molded disc, and consequently boundary lines appear between early and later released areas which generates the undesired cloud marks on the surface of the information area of the disc.

SUMMARY OF THE INVENTION

In light of the above mentioned problems, it is an object of the present invention to provide a novel method for preventing the occurrence of the round corner D along the edge of the central aperture.

Another object of the present invention is to provide a novel method for preventing the appearance of the undesired cloud marks on the surface of the information area of the disc.

In general, it is an object of the invention to overcome deficiencies in the prior art, such as mentioned above.

To accomplish the above objects, the invention provides a novel system, especially a method, such that just after the gate cutter 25 is protruded to sever the gate portion G as shown in FIG. 2, an ejector sleeve 24 is extended slightly into the cavity C to press molten resin around the inner periphery H of the central aperture in the disc, consequently to prevent the occurrence of the round corner D along the edge of the central aperture during severing of the gate portion.

Other and further objects and the nature and advantages of the invention will become clear to those skilled in the art from the following detailed description of an embodiment taken in conjunction with the drawing, wherein:

BRIEF DESCRIPTION OF THE DRAWINGS

FIG. 4 shows a time sequence chart by which the method of the invention is carried out.

DETAILED DESCRIPTION OF THE PREFERRED EMBODIMENT

The following example is included merely to aid in the understanding of the invention, and variations may be made by one skilled in the art without departing from the spirit and scope of the invention.

Figure 1:
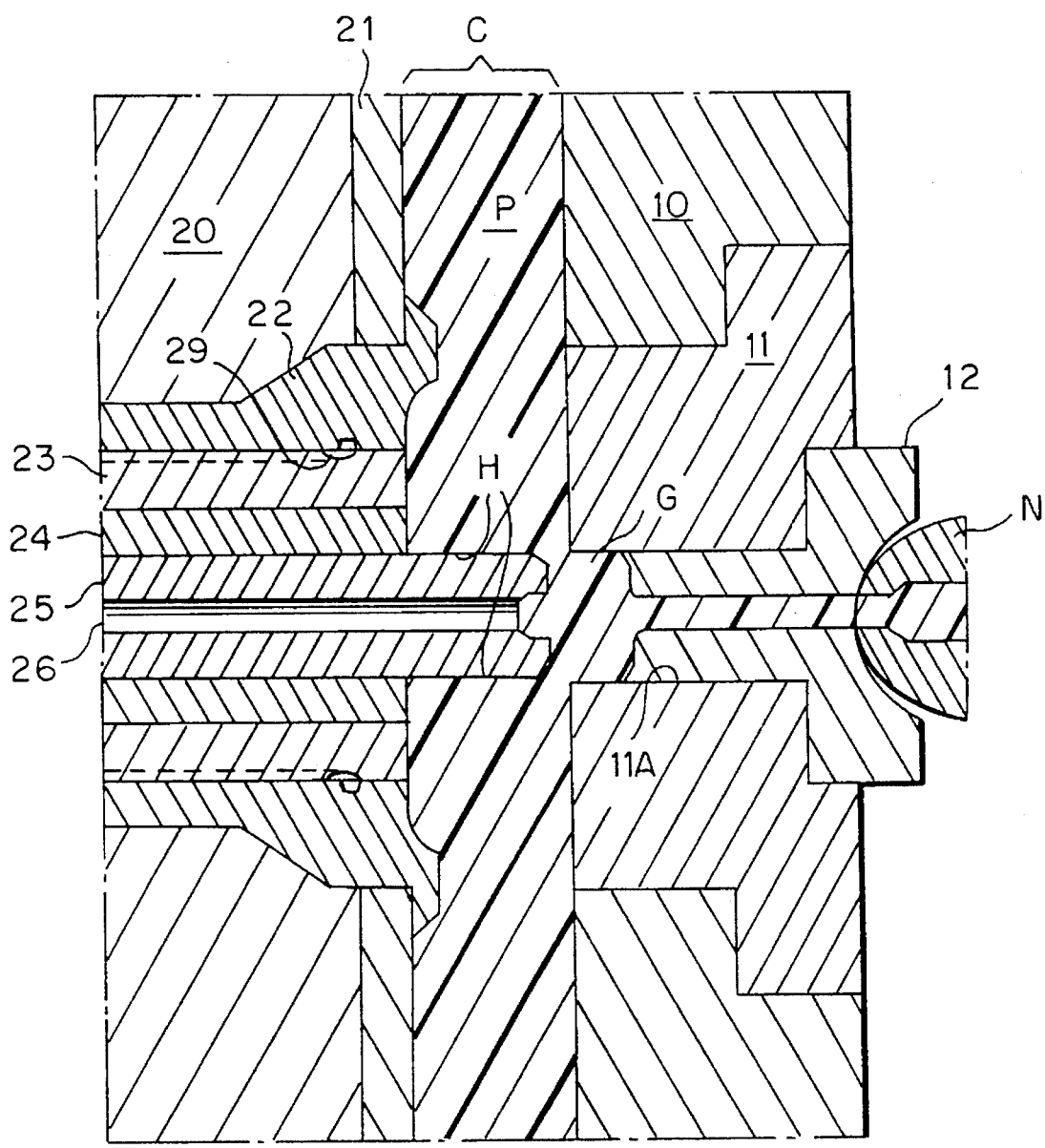
FIG. 1 is a fragmentary sectional view of the mold halves for molding a disc at a stage when injecting molten resin into the cavity C has just finished.
Figure 2:
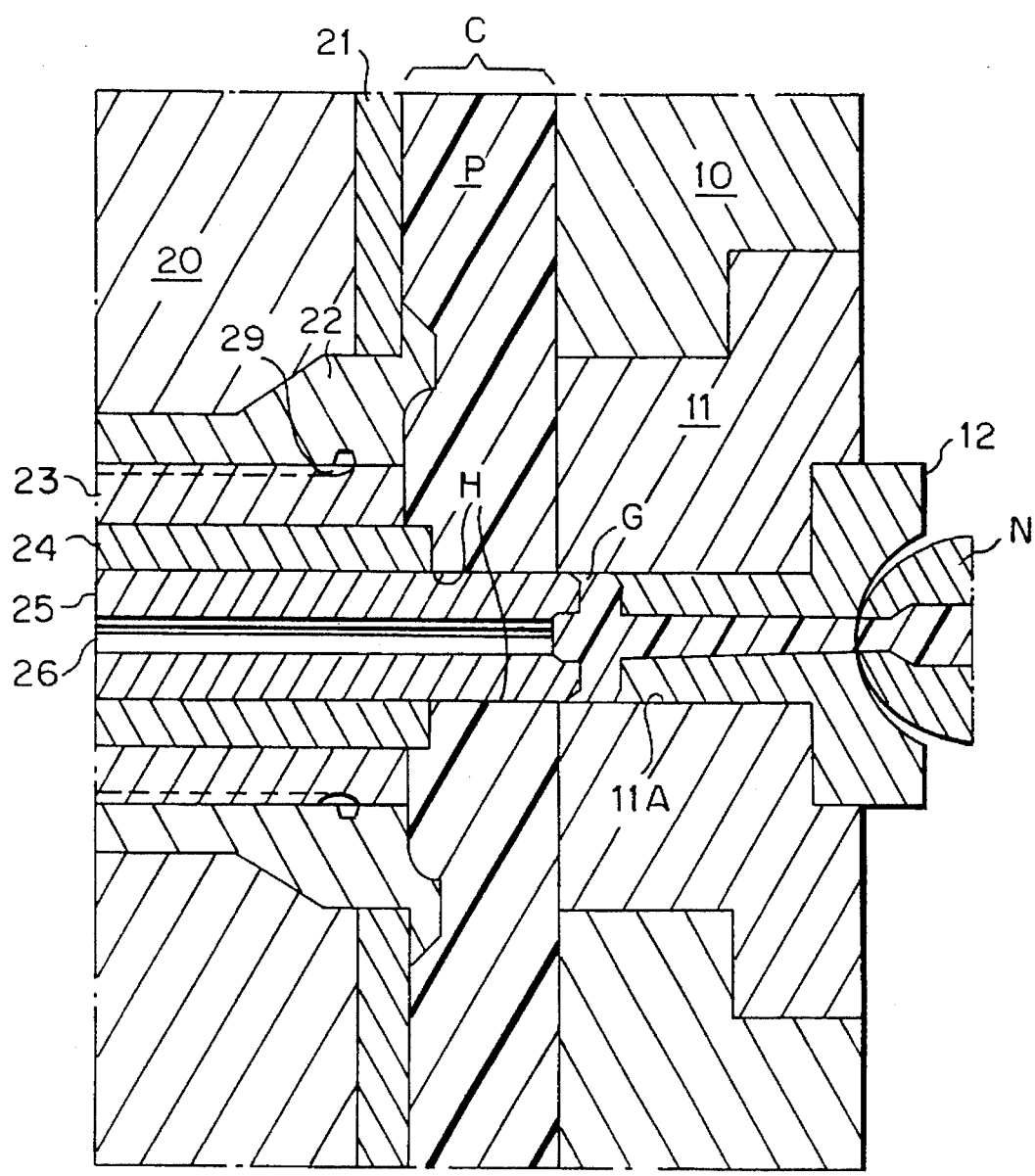
FIG. 2 is a fragmentary sectional view of the mold halves of FIG. 1 for molding a disc at a stage when severing of the gate G has just been completed.
Figure 3:
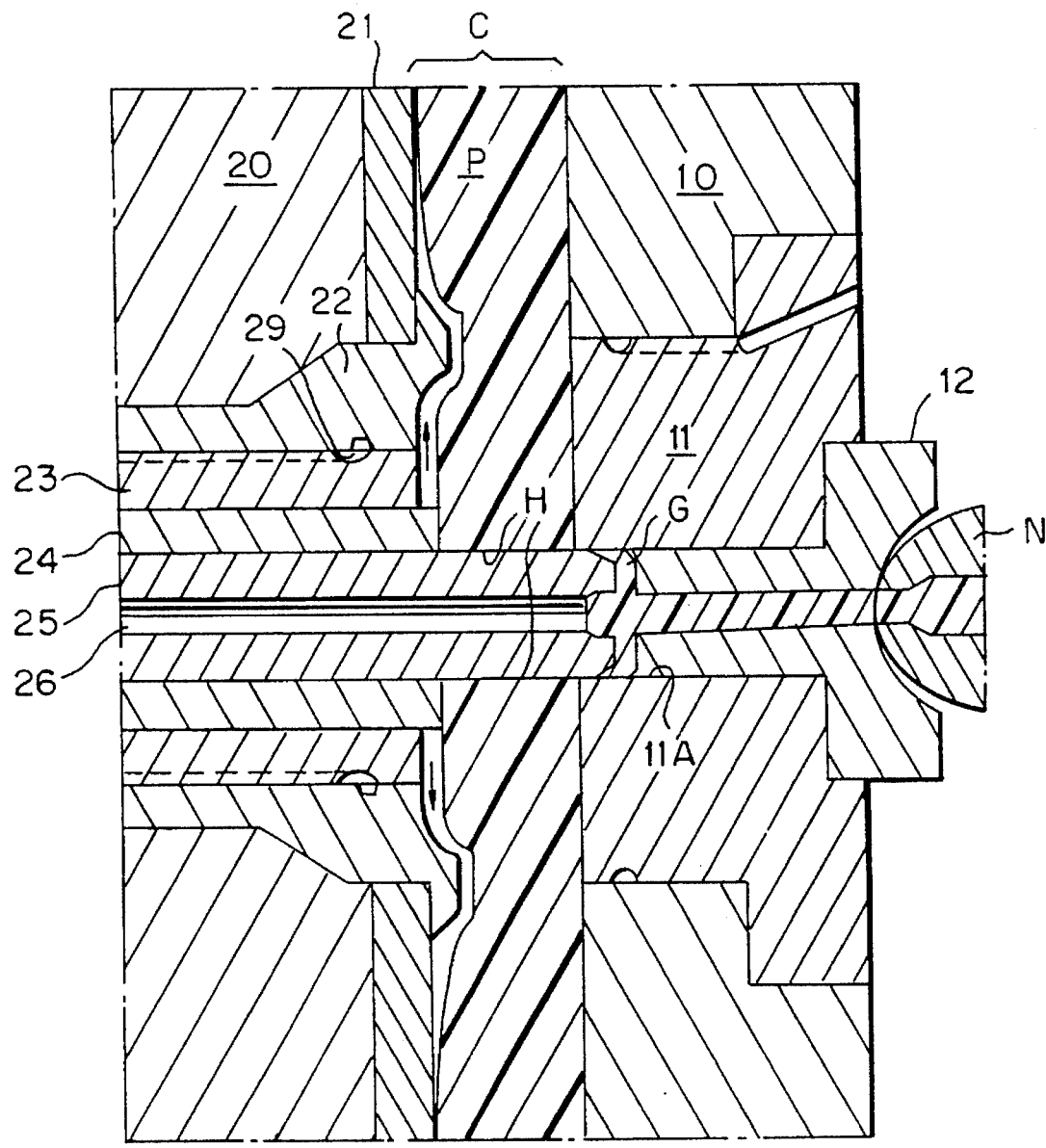
FIG. 3 is an exaggerated fragmentary sectional view of the mold halves of FIGS. 1 and 2 for molding a disc at a stage when the molded disc is just about to be released by blown air.
Figure 6:
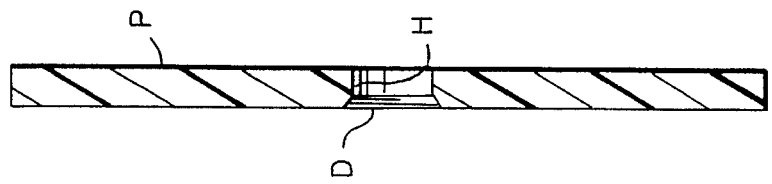
FIG. 6 is an enlarged sectional view of a prior art molded disc made according to FIG. 5 showing the round corner D along edge of the central aperture of the molded disc.
Figure 5:
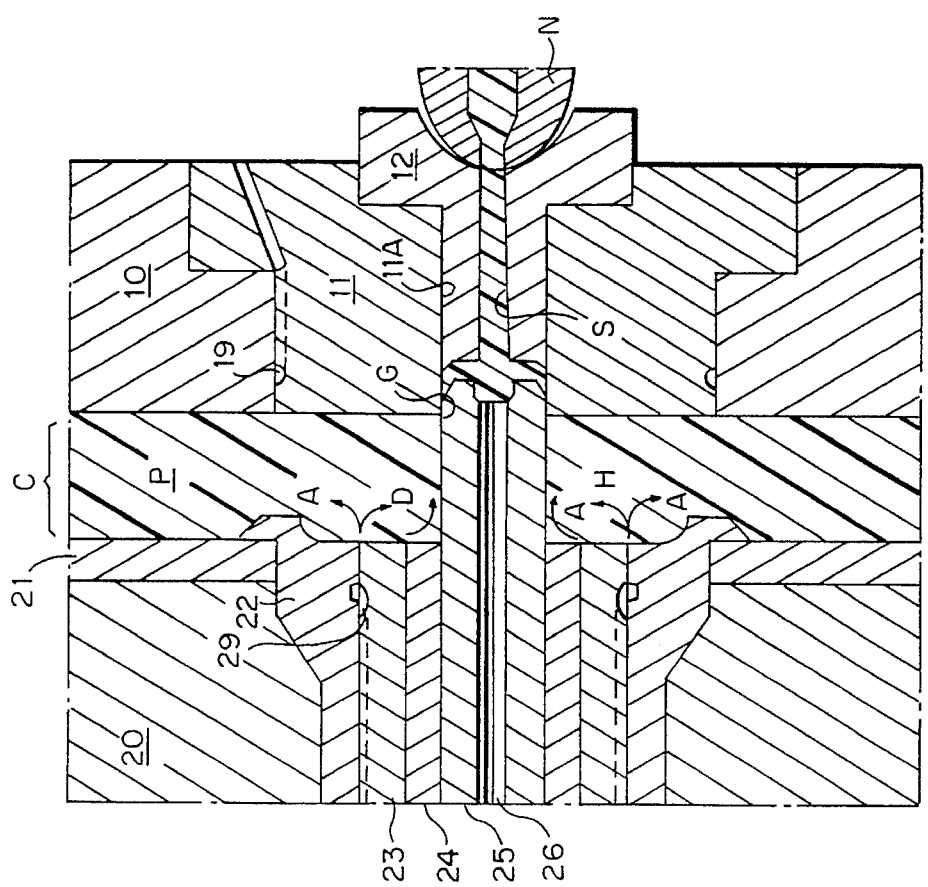
FIG. 5 shows a prior art system including a mold which comes into use generally for the injection molding of compact discs and laser discs, etc.

Referring to the drawings, a cavity C is formed by closing a movable mold half 20 to a stationary mold half 10 as shown in FIGS. 1, 2 and 3. A female cutter 11 providing a hole 11A is inserted in the center portion of the stationary mold half 10. A sprue bushing 12 is secured coaxially to the hole 11A of the female cutter 11. An opening through the sprue bushing 12 is selectively placed in communication with an opening of plastic material injection nozzle N. A stamper 21 is retained at the side of the movable mold half 20, to form a surface of the cavity C, by a central stamper holder 22 which retains the stamper 21 in the center portion of the cavity C; and another stamper holder (not shown in the figures is provided) which retains the stamper 21 on the periphery of the cavity C. A bushing 23 is inserted coaxially and fixedly into the center hole provided in the center of the central stamper holder 22. An ejector sleeve 24 is inserted coaxially and moveably in the bushing 23. A gate cutter 25 is inserted coaxially and moveably in the ejector sleeve 24. An ejector pin 26 is inserted coaxially and moveably in the gate cutter 25.

An outlet 29 for blowing air is provided at the end of an air passage provided between the inner periphery of the central stamper holder 22 and the outer periphery of the bushing 23.

In operation, FIG. 1 shows the cavity C filled with the molten resin of predetermined quantity which has been injected into the cavity C through a gate G from the nozzle N. The gate cutter 25 and the ejector sleeve 24 are retracted to a respective rear end limit of each of the gate cutter 25 and the ejector sleeve 24 (in other words, to their respective retracted limit position) to open the gate G until completion of injecting of the molten resin as shown in the time chart of FIG. 4.

Before the injected molten resin becomes solid after completion of the injection, the gate cutter 25 is protruded into the hole 11A of the female cutter 11 through the cavity C to clog the gate G, that is, to sever the gate G as shown in FIG. 2. Then, just after commencement of protrusion of the gate cutter 25, the first protrusion or extension of ejector sleeve 24 is commenced. Displacement of the ejector sleeve 24 as shown in FIG. 2 is sufficient to press the molten resin with which the protruded gate cutter is surrounded so as to prevent formation of the round corner D along the edge of the central aperture. In the preferred embodiment of the invention, the above amount of the first protrusion or displacement of the ejector sleeve 24 need be only about 0.5 mm for an ejector sleeve 24 having an outer diameter 15 mm and an inner diameter 12 mm.

When a predetermined cooling time for solidifying of molded disc has passed, that is, after the step of cooling is substantially completed, after severing of the central aperture of the molded disc, the movable mold half 20 commences to retract for mold opening. The ejector sleeve 24 which was protruded already slightly for pressing molten material then commences again to protrude additionally against the molded disc to make the solidified molded disc release from the cavity C just after mold opening.

On the other hand, after commencement of the first protrusion of the ejector sleeve 24 and just before commencement of the second protrusion of the ejector sleeve 24, air is blown from the outlet 29 of the passage provided between the inner periphery of the central stamper holder 22 and the outer periphery of the bushing 23, into cavity C, for releasing the molded disc P from the cavity C as shown in the time chart of FIG. 4 and in FIG. 3, under such conditions that the molten resin with which the protruded gate cutter is surrounded, is kept pressed by the first protruding of the ejector sleeve 24.

The ejector sleeve 24 which has finished the second protrusion for releasing the solidified molded disc is then retracted so that the molded disc will not fall out of the cavity C too early. The purpose of second protrusion of the ejector sleeve 24 is to release slightly the molded disc from the cavity C but not to eject it out the cavity C.

When mold opening has just been completed, retracting of the gate cutter 25 and the protrusion of the center ejector pin 26 are then commenced simultaneously, and the ejector sleeve 24 commences the third protrusion to eject the molded disc out of the cavity C. The sprue gate of the molded disc P which has been severed is ejected by the protrusion of the center ejector pin 26.

After the molded disc P and the sprue gate are taken out the cavity C with a robot arm (not shown in the figures), the ejector sleeve 24 and the center ejector pin 26 are retracted simultaneously, upon which a cycle of the injection molding of the disc has been completed.

As above described, the present invention includes a novel method whereby formation of the undesirable round corner D is prevented, because the first protrusion of the ejector sleeve 24 presses the molten resin with which the protruded gate cutter is surrounded after or just after the protrusion of the gate cutter 25 in order to moderate influence of the drag flow of molten resin due to the protrusion of the gate cutter 25. Consequently it is then possible to reduce the cycle time without fear of forming the undesired round corner D.

The present invention also results in elimination of cloud marks which would otherwise appear on the surface of the molded disc, because air is blown from the outlet of the passage provided between the inner periphery of the central stamper holder 22 and the outer periphery of the bushing 23, into cavity C for releasing the molded disc from the cavity C under conditions such that the molten resin with which the protruded gate cutter is surrounded is kept pressed by the ejector sleeve 24 during its first and second protrusions so that the blown air does not leak into the inner periphery H, but instead flows uniformly radially as shown in FIG. 3 to provide uniform cooling.

The foregoing description of the specific embodiments reveal the general nature of the invention so that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A method for molding a disc with a central aperture which comprises:

injecting molten resin into the cavity formed by closing a movable mold half to a stationary mold half, through a sprue gate from a nozzle, keeping a gate cutter and an ejector sleeve in which the gate cutter is inserted coaxially and moveably, in respective retracted limit positions until completion of the injection, protruding the gate cutter into the hole of a female cutter after completion of injection and before solidifying of molten resin in order to form a central aperture of a molded disc and a severed sprue within said sprue gate, commencing a first protrusion of the ejector sleeve after commencement of the protrusion of the gate cutter for pressing the molten resin with which the protruded gate cutter is surrounded, and thus preventing formation of a round corner formed along an edge of the central aperture;

cooling the molded disc;

releasing and ejecting a solidified molded disc from the cavity after opening of mold halves and ejecting a severed sprue.

2. The method for molding a disc with a central aperture as defined in claim 1, comprising commencing a second protrusion of the ejector sleeve on opening of the mold halves after completion of the step of cooling the molded disc for releasing slightly the solidified molded disc from the cavity, retracting the ejector sleeve after completion of the second protrusion of the ejector sleeve, protruding a center ejector pin which is inserted coaxially and moveably into the gate cutter for ejecting the sprue, retracting the gate cutter on completion of opening of mold halves to enable the molded disc to fall out from the cavity, commencing a third protrusion of the ejector sleeve for ejecting the molded disc out of the cavity on completion of opening of mold halves, and retracting the ejector sleeve and the center ejector pin respectively after ejecting the molded disc and the sprue.

3. A method for molding a disc with a central aperture which comprises:

injecting molten resin into a cavity formed by closing a movable mold half to a stationary mold half, through a sprue gate from a nozzle, keeping a gate cutter and an ejector sleeve in which the gate cutter is inserted coaxially and moveably, in respective retracted limit positions until completion of the injection, protruding said gate cutter into a bore of a female cutter after completion of injection for forming a central aperture of a molded disc, commencing a first protrusion of said ejector sleeve just after commencement of the protrusion of the gate cutter under conditions of pressing the molten resin with which the protruded gate cutter is surrounded, for preventing occurrence of a round corner formed along an edge of the central aperture;

cooling the molded disc;

commencing a second protrusion of the ejector sleeve on opening of the mold halves after completion of the step of cooling the molded disc for releasing slightly the molded disc from surface of the cavity, blowing air from an outlet of an air passage provided between an inner periphery of the central stamper holder and an outer periphery of the bushing into said cavity for releasing the molded disc from the cavity after commencement of the first protrusion of the ejector sleeve and just before commencement of the second protrusion of the ejector sleeve, releasing and ejecting a solidified molded disc from the cavity after opening of said mold halves and also ejecting a severed sprue.

4. The method for molding a disc with a central aperture as defined in claim 3, comprising retracting the ejector sleeve after completion of the second protrusion of the ejector sleeve, for releasing slightly the solidified molded disc from the surface of the cavity, protruding a center ejector pin which is inserted coaxially and moveably into the gate cutter for ejecting a sprue, retracting the gate cutter on completion of opening of mold halves to enable the molded disc to fall out the cavity, commencing a third protrusion of the ejector sleeve for ejecting the molded disc out of the cavity on completion of opening of mold halves, and retracting the ejector sleeve and the center ejector pin respectively after ejecting the molded disc and the sprue.

* * * * *